Dec. 11, 1934.  F. H. STEARNS ET AL  1,983,713
SOUND INSULATED SHAFT MOUNTING
Filed April 5, 1934
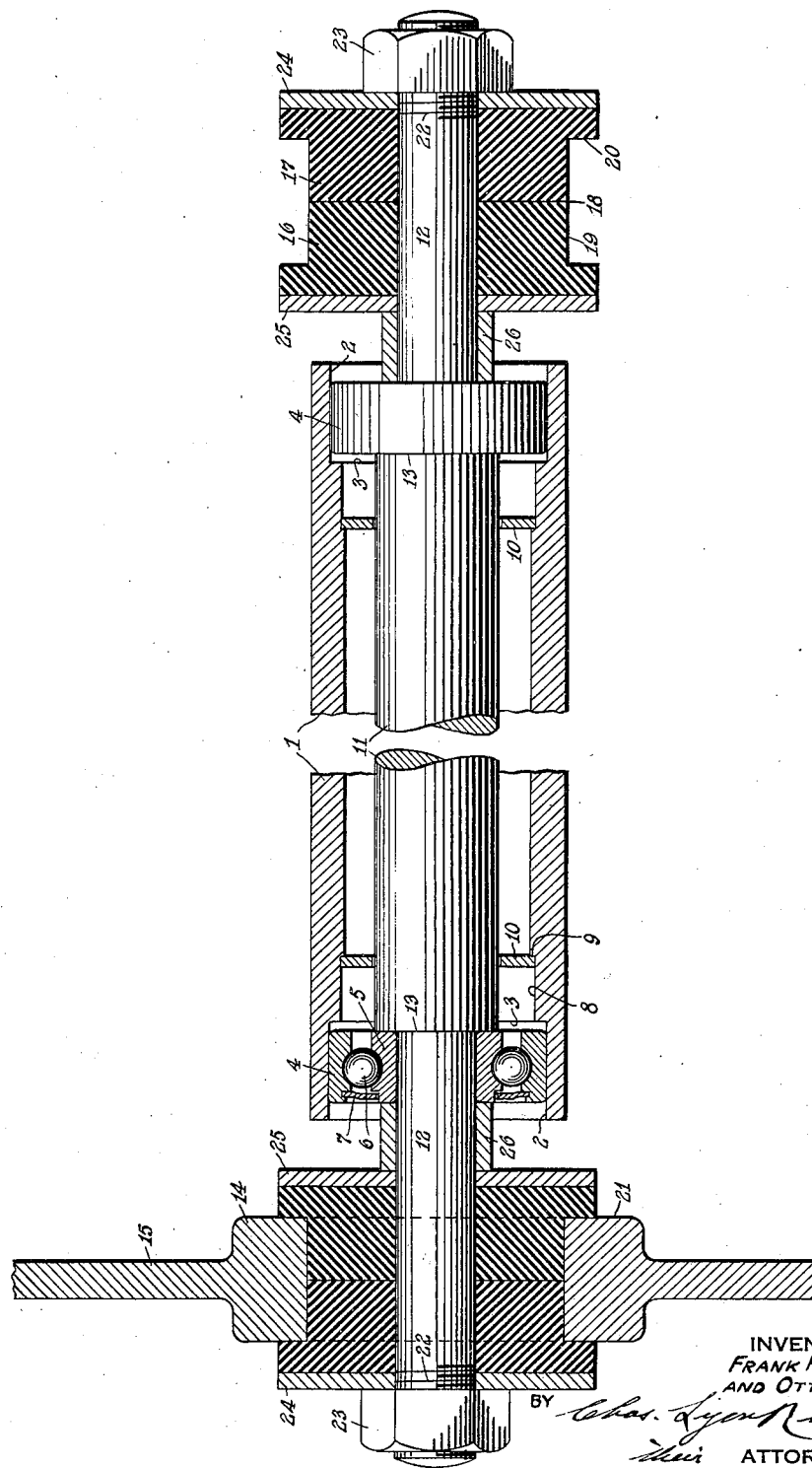
INVENTORS
FRANK H. STEARNS
AND OTTO NEUMER
BY
ATTORNEY Patented Dec. 11, 1934

1,983,713

UNITED STATES PATENT OFFICE 1,983,713

SOUND INSULATED SHAFT MOUNTING

Frank H. Stearns, Highland Park, Mich., and Otto Neumer, Glenside, Pa., assignors to S K F Industries, Inc., Philadelphia, Pa., a corporation of Delaware Application April 5, 1934, Serial No. 719,174

8 Claims. (Cl. 308—184)

This invention relates to a sound deadening mounting or support for high speed rotary members.

An object of the invention is to so mount a dead shaft upon which a rotary member is mounted that the vibration will be absorbed or deadened.

Another object of the invention is to afford means for mounting the fans and their driving pulley used in air conditioning devices upon a dead shaft supported on cushioning members.

Another object of the invention is to mount a fan and its pulley upon a tubular shaft carrying the outer race rings of anti-friction bearings, the inner race rings of such bearings being mounted upon a dead shaft which shaft is supported by cushioning and sound deadening members secured to the frame of the device.

The drawing accompanying this specification represents in longitudinal section one practical embodiment of the invention. The form of embodiment of the invention illustrated herewith is one which was designed primarily for use in an air conditioning device in which the rotary members of suction or blowing devices are mounted on a tubular shaft 1 upon which is also mounted the pulley by which the shaft is rotated, the parts of these devices being of well known construction have not been illustrated in the drawing since they form no part of the invention.

Each end of the tubular shaft 1 is preferably enlarged internally as at 2 forming a bearing housing opening outwardly and having an internal shoulder 3 for limiting the inward movement of the anti-friction bearing. In the illustration each anti-friction bearing is shown comprising an outer ring 4 preferably mounted with a floating fit within the housing 2 and an inner ring 5. These rings are represented as of deep groove ball bearing type and are held together by means of a single row of balls 6. In the present illustration a combined dust guard and grease plate 7 is carried by the outer ring 4.

Each end of the shaft is shown having a slight enlargement rearwardly of the housing 2 as at 8 ending in a shoulder 9 for receiving and positioning an inner plate 10 designed to prevent the oil and grease from being drawn out of the bearing by centrifugal action.

The shaft 11 which is provided with reduced end portions 12 is intended to remain stationary— a dead shaft. The inner part of the reduced portions 12 constitute seats for the inner rings 5 of the bearings which are held against shoulders 13 formed at the ends of the main part of the shaft.

The end portions of the shaft, preferably the reduced portions 12, are shown mounted in rubber blocks or bushings which are carried by hubs 14 formed on the walls 15 of the casing for the device, which in a way constitute the main frame of the mechanism. Preferably each of these rubber blocks is formed in two sections 16 and 17, the plane of juncture, represented by the line 18, between the sections is preferably centrally located, the blocks having portions 19 for lying within the bore of the hub and a flange 20 for engaging the side face 21 of the hub 14. The two halves or sections 16 and 17 of each block have a central opening of sufficient size to permit of their being assembled upon the ends 12 of the shaft and of being assembled within the hub from opposite sides.

The extreme ends of the shaft are shown having screw threads 22 for receiving nuts 23. Outwardly of each rubber block or bushing and inwardly of it we preferably mount a plate washer 24 and 25.

Suitable compression it applied to the parts and the inner rings of the bearings are held against the shoulders 13 by interposing a spacer 26 of suitable length between each inner plate washer 25 and the adjacent inner ring 5 of the bearing whereupon by tightening up the nuts 23 the rubber blocks or bushings are compressed and caused to tightly engage the ends 12 of the shaft and the bores and flanks of the hubs 14 so that vibrations imposed upon the shaft 11 in all directions are cushioned and absorbed to the end that the structure as a whole operates quietly.

It is to be understood that changes will be made in the details of construction within the limits of the claims without departing from the spirit of our invention.

Having thus described our invention, we claim and desire to secure by Letters Patent:

1. In a device of the character specified, the combination with a housing furnished with a pair of hubs, of rubber bushings mounted in the hubs, a dead shaft having its ends mounted in the bushings, the shaft being formed inwardly thereof at each end with a bearing seat and a shoulder inwardly of the seat, an anti-friction bearing having its inner ring mounted on such seat, a washer plate located on the inner face of the bushing, a spacer between the plate and the inner ring of the bearing, the outer end of the shaft being screw threaded, a washer plate mounted on the shaft outwardly of the bushing and a nut mounted on the screw thread and engaging the outer plate and compressing the bushing against the hub and against the shaft and clamping the inner washer plate against the spacer and thereby forcing the bearing to its seat against the said shoulder.

2. In a device of the character specified, the combination with a housing furnished with a pair of hubs, of rubber bushings mounted in the hubs, a dead shaft having its ends mounted in the bushings, the shaft being formed inwardly thereof at each end with a bearing seat and a shoulder inwardly of the seat, an anti-friction bearing having its inner ring mounted on such seat, a washer plate located on the inner face of the bushing, a spacer between the plate and the inner ring of the bearing, the outer end of the shaft being screw threaded, a washer plate mounted on the shaft outwardly of the bushing and a nut mounted on the screw thread and engaging the outer plate and compressing the bushing against the hub and against the shaft and clamping the inner washer plate against the spacer and thereby resiliently forcing the bearing to its seat against the said shoulder.

3. In a device of the character specified, the combination with a housing furnished with a pair of hubs, of rubber bushings mounted in the hubs, a dead shaft having its ends mounted in the bushings, the shaft being formed inwardly thereof at each end with a bearing seat and a shoulder inwardly of the seat, an anti-friction bearing having its inner ring mounted on such seat, a washer plate located on the inner face of the bushing, a spacer between the plate and the inner ring of the bearing, the outer end of the shaft being screw threaded, a washer plate mounted on the shaft outwardly of the bushing and a nut mounted on the screw thread and engaging the outer plate and compressing the bushing against the hub and against the shaft and clamping the inner washer plate against the spacer and thereby forcing the bearing to its seat against the said shoulder, there being a tubular shaft surrounding the dead shaft and having bearing housings formed in its ends, the outer race rings of the anti-friction bearings being mounted in such housings.

4. In a device of the character specified, the combination with a housing furnished with a pair of hubs each having a bore and side faces, of rubber bushings mounted in the hubs, each bushing being formed in two sections and a dead shaft having its ends mounted in the bushings, the shaft being formed inwardly thereof at each end with a bearing seat and a shoulder inwardly of the seat, an anti-friction bearing having its inner ring mounted on such seat, a washer plate located on the inner face of the bushing, a spacer between the plate and the inner ring of the bearing, the outer end of the shaft being screw threaded, a washer plate mounted on the shaft outwardly of the bushing and a nut mounted on the screw thread and engaging the outer plate and compressing the bushing against the hub and the shaft and clamping the inner washer plate against the spacer and thereby forcing the bearing to its seat against the said shoulder.

5. In a device of the character specified, the combination with a housing furnished with a pair of hubs each having a bore and side faces, of rubber bushings mounted in the hubs, each bushing being formed in two sections and affording portions for entering the bore of the hub and flanges for lying against the side faces of the hubs, a dead shaft having its ends mounted in the bushings and means for clamping the bushing against the hub and the shaft, the shaft being formed inwardly thereof at each end with a bearing seat and a shoulder inwardly of the seat, an anti-friction bearing having its inner ring mounted on such seat, a washer plate located on the inner face of the bushing, a spacer between the plate and the inner ring of the bearing, the outer end of the shaft being screw threaded, a washer plate mounted on the shaft outwardly of the bushing and a nut mounted on the screw thread and engaging the outer plate and compressing the bushing against the hub and the shaft and clamping the inner washer plate against the spacer and thereby forcing the bearing to its seat against the said shoulder.

6. In a device of the character specified, the combination with a pair of hubs, of rubber bushings mounted in the hubs, a dead shaft having its ends mounted in the bushings, the shaft being formed inwardly thereof at each end with a bearing seat, an antifriction bearing having its inner ring mounted on each such seat, means for compressing the bushing against the hub and against the shaft, and a tubular live shaft having bearing housings formed at its ends in which the outer rings of the said antifriction bearings are respectively mounted.

7. In a device of the character specified, the combination with a pair of hubs, of rubber bushings mounted in the hubs, a dead shaft having its ends mounted in the bushings, the shaft being formed inwardly thereof at each end with a bearing seat, an antifriction bearing having its inner ring mounted on such seat, a washer plate located on the inner face of the bushing, spacer means between the plate and the inner ring of the bearing, a washer plate mounted on the shaft outwardly of the rubber bushing, and means for pressing the outer plate against the bushing and compressing this against the hub and against the shaft and clamping the inner washer plate against the spacer means.

8. In a device of the character specified, the combination with a pair of hubs, of rubber bushings mounted in the hubs, a dead shaft having its ends mounted in the bushings, the shaft being formed inwardly thereof at each end with a bearing seat, an antifriction bearing having its inner ring mounted on such seat, a washer plate located on the inner face of the bushing, a washer plate mounted on the shaft outwardly of the rubber bushing, and means for pressing the plates against the bushing and compressing this against the hub and against the shaft.

FRANK H. STEARNS.
OTTO NEUMER.